(12) United States Patent
Jakubowski, Jr. et al.

(10) Patent No.: US 7,007,895 B2
(45) Date of Patent: Mar. 7, 2006

(54) VARIABLE FLOW RESTRICTING DEVICES

(75) Inventors: Thaddeus Jakubowski, Jr., St Charles, MO (US); John K. Foster, St Peters, MO (US); Cory G. Keller, Fenton, MO (US)

(73) Assignee: The Boeing Company, Chicago, IL (US)

( * ) Notice: Subject to any disclaimer, the term of this patent is extended or adjusted under 35 U.S.C. 154(b) by 156 days.

(21) Appl. No.: 10/875,844

(22) Filed: Jun. 23, 2004

(65) Prior Publication Data

US 2006/0006288 A1   Jan. 12, 2006

(51) Int. Cl.
*B64D 1/12* (2006.01)

(52) U.S. Cl. .................. 244/137.4; 89/1.54
(58) Field of Classification Search ............ 244/137.4; 89/1.51, 1.54, 1.58, 1.59
See application file for complete search history.

(56) References Cited

U.S. PATENT DOCUMENTS

| | | |
|---|---|---|
| 5,583,312 A | 12/1996 | Jakubowski, Jr. |
| 6,009,788 A | 1/2000 | Jakubowski, Jr. et al. |
| 6,035,759 A | 3/2000 | Jakubowski, Jr. et al. |
| 6,796,530 B1 * | 9/2004 | Jakubowski et al. ..... 244/137.4 |
| 6,811,123 B1 * | 11/2004 | Foster et al. ............. 244/137.4 |

* cited by examiner

*Primary Examiner*—Peter M. Poon
*Assistant Examiner*—Timothy D. Collins
(74) *Attorney, Agent, or Firm*—Black Lowe & Graham, PLLC

(57) ABSTRACT

A pneumatically operated stores ejector rack for an aircraft having an adjustable flow restricting device for variably apportioning the flow of pressurized gas from a manifold to the store ejection thrusters. The flow restricting device includes at least one adjustable valve assembly, having a valve and a valve body, for varying the pressure of gas supplied to the thruster. It also includes a feed conduit connecting the manifold and the valve, and a collar threadably engageable with the manifold and the feed conduit for urging the valve into contact valve body. Also disclosed is a method for apportioning the flow of pressurized gas between a pair of thrusters in a stores ejection rack which includes the flow restricting device.

13 Claims, 5 Drawing Sheets

VARIABLE FLOW RESTRICTING DEVICES

FIELD OF THE INVENTION

This invention relates generally to store ejector racks for aircraft, and more particularly to apparatus and methods for variably restricting and apportioning pressurized fluid to one or more fluid actuated thrusters of an aircraft ejector rack system.

BACKGROUND OF THE INVENTION

An aircraft ejector rack is a device used to carry and release stores such as bombs and missiles from an aircraft in flight. These racks are typically mounted to the undersurfaces of aircraft wings and fuselages and incorporate both release and ejection features. The release features normally include bails or hooks from which stores may be suspended, and the ejection features normally include pneumatically operated rams for forcibly ejecting stores away from the aircraft to minimize the possibility of their colliding with the aircraft after release.

A contemporary ejection rack system of the type described above incorporates an onboard pressurization capability, employing a single pressurization system capable of operating multiple release mechanisms and uses air to operate both the store release bails and ejector rams. The system also includes a miniature compressor and a gas purification system which filters, dries, and stores ambient air as an energy medium. With the onboard compressor, pressure in the system can be maintained at the desired operating level regardless of system usage or temperature changes in the gas. The use of air eliminates the problems associated with the use of pyrotechnics to generate high pressure gasses, such as periodic cleaning required by the corrosives and moisture generated in such systems, and also eliminates the sealing problems commonly found in hydraulically operated ejector racks. An example of such a state-of-the-art pneumatically operated ejector rack system is seen in U.S. Pat. No. 5,583,312.

It has also been found to be desirable to apply differential forces to a store upon release from an aircraft in order to impart a predetermined pitch rate to it. By doing so, the store can be directed upon a flight path which will carry it away from the aircraft so as to minimize the possibility of a store colliding with the aircraft after release. In prior pneumatic systems, such pitch rate control has been accomplished by varying the flow rate and pressure of the fluid supplied to the thrusters. Among the means employed to vary pressure among a group of thrusters have been replaceable orifices of varying cross sectional areas and adjustable orifices disposed in the manifolding between the pressure source and the thrusters. A typical example of an adjustable orifice is shown in U.S. Pat. No. 6,009,788, which will be described in greater detail below. A significant advantage of this particular variable orifice design is that it permits adjustment without disassembling of the ejector system and eliminates the necessity of maintaining an inventory of replaceable orifices. One problem that has been encountered with this system, however, is that in operation the variable orifices assembly tended to leak, making calibration of the device difficult.

Accordingly, there is an unmet need in the art for a pneumatically operated ejector rack including a thruster actuation system having a plurality of improved adjustable flow restricting devices for supplying differential fluid pressure to the thrusters.

SUMMARY OF THE INVENTION

This invention can be broadly summarized as providing for a stores ejector rack for an aircraft. In one particular embodiment, a rack includes at least one pneumatically operated thruster for ejecting a store away from the aircraft, and a manifold for distributing pressurized gas from a source such as a compressor to the thruster. Particularly, the rack includes an adjustable valve assembly, including first and second valve members, for varying the pressure of the gas supplied to the thruster. The rack also includes a feed conduit connected to the manifold and to one of the valve members and a collar engageable with the manifold and the feed conduit for urging the valve members into contact.

In accordance with one embodiment of the invention, a collar is threadably engaged with the feed conduit and may be rotated into contact with the manifold. In accordance with a second embodiment of the invention, a collar is threadably engaged with the manifold and may be rotated into contact with the feed conduit. In accordance with a more detailed aspect of both embodiments of the invention, a fluid tight seal is disposed between the manifold and the feed conduit.

This invention can also be broadly summarized as providing for a method of variably apportioning pressurized fluid flow between two pneumatically actuated thrusters of an aircraft stores ejector rack. The ejector rack includes a manifold, a pair of feed conduits, each of which is connected to the manifold, and a pair of thrusters. Each of the thrusters is in communication with a valve assembly connected to one of the feed conduits, and is adjustable in flow rate by rotation of the feed conduit. Also, a collar is threadably mounted for rotation on each of the feed conduits and is engageable with the manifold. The method includes introducing pressurized fluid from a source into the manifold, disengaging the collars from the manifold so that the feed conduits may be rotated, adjusting the valve assemblies is to obtain the desired apportionment of pressurized fluid between the thrusters, and tightening the collars against the manifold.

DETAILED DESCRIPTION

The present invention relates to apparatus and methods for separating stores from an aircraft. Many specific details of certain embodiments of the invention are set forth in the following description and in FIGS. 1–5 to provide a thorough understanding of such embodiments. One skilled in the art, however, will understand that the present invention may have additional embodiments, or that the present invention may be practiced without several of the details described in the following description.

Figure 1:
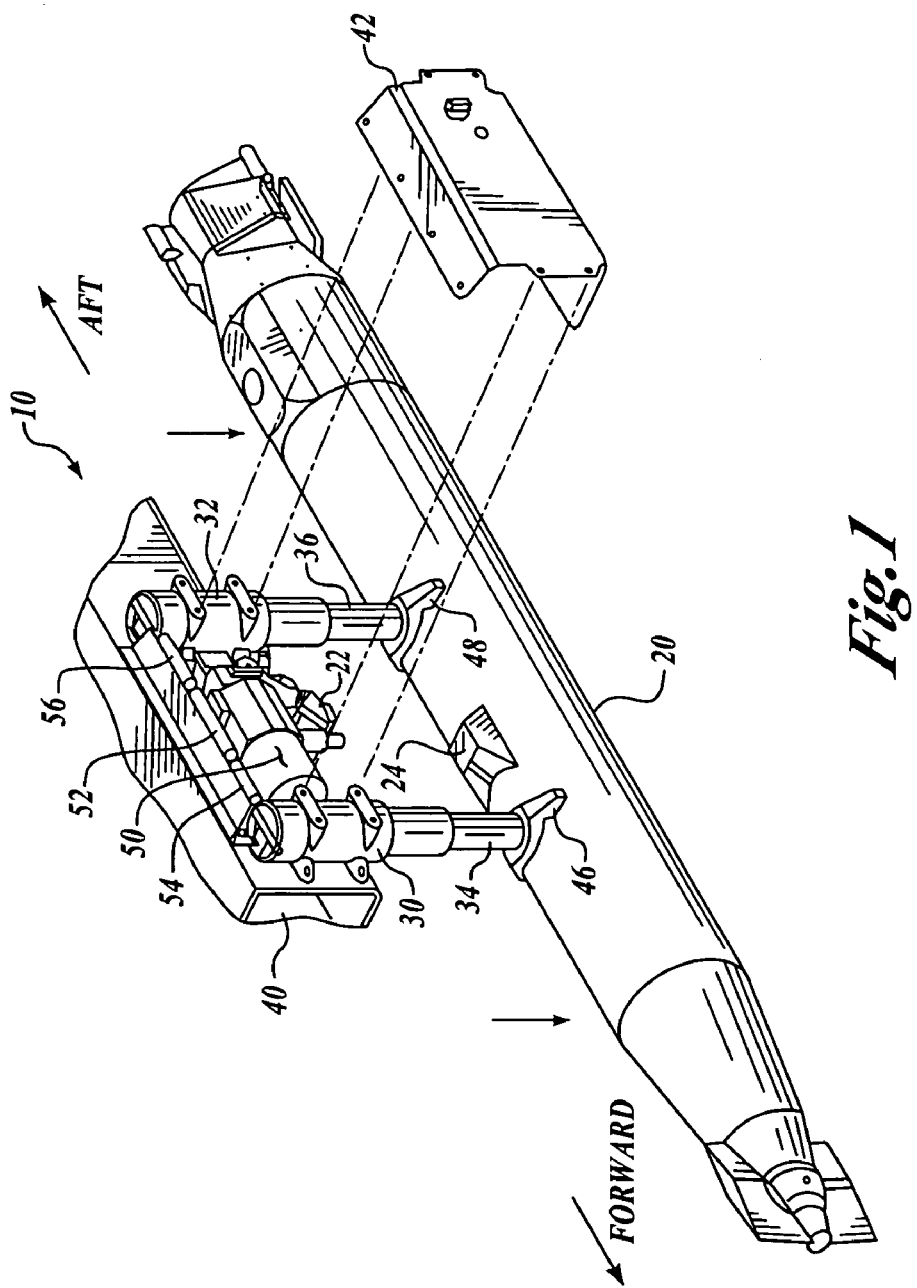
FIG. 1 is a perspective view of an ejector rack constructed in accordance with an embodiment of the present invention.
Figure 2:
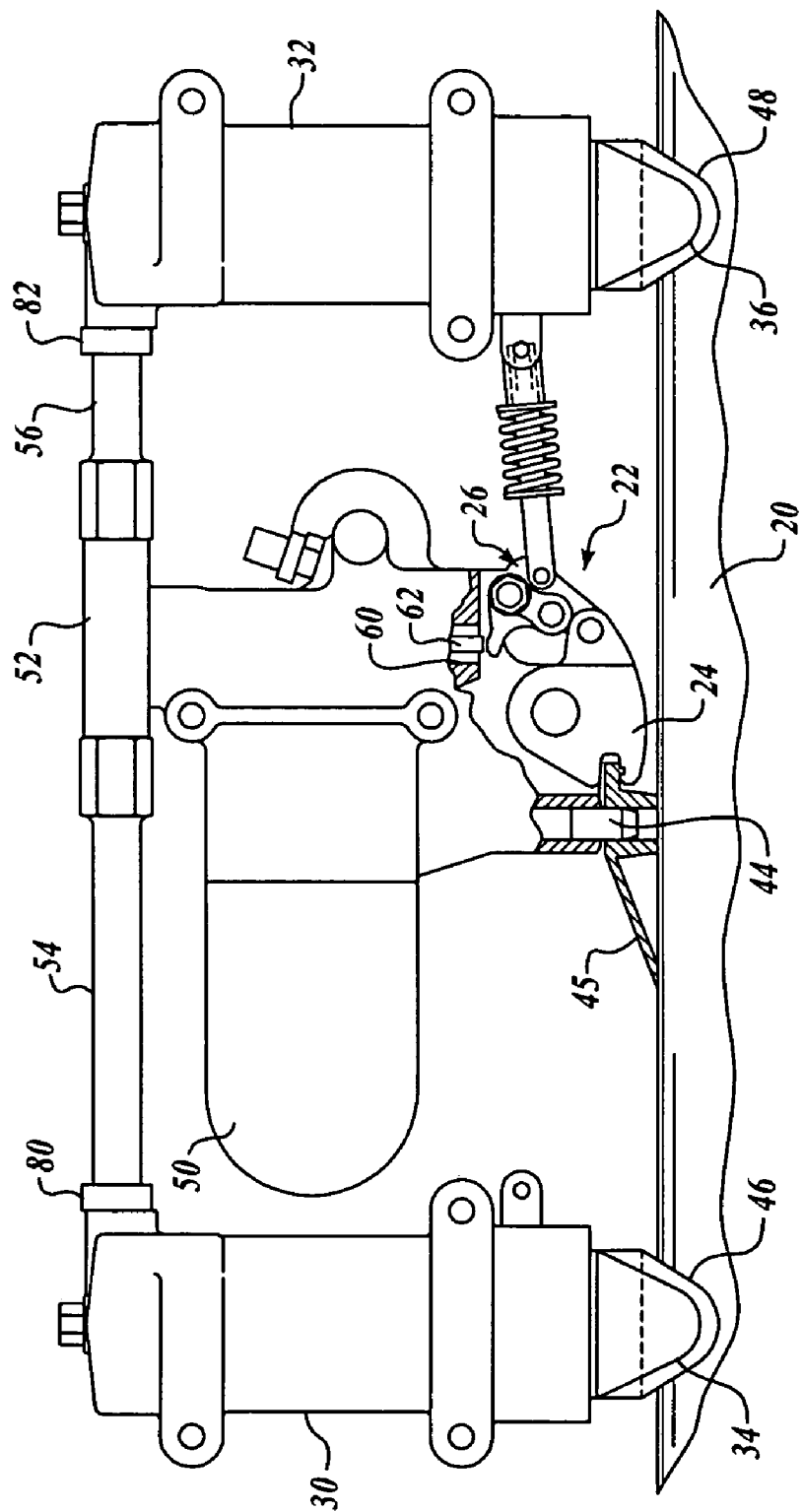
FIG. 2 is a side view of a portion of the ejector rack of FIG. 1.

In FIGS. 1 and 2 of those drawings, a pneumatic ejector rack assembly for forcibly ejecting a store from an aircraft in accordance with an embodiment of the present invention is illustrated and generally designated by the numeral 10. Store 20 is suspended from the ejector rack assembly by carrier 22 which includes hook 24 and hook actuating mechanism 26. The rack assembly also includes pneumatically actuated thrusters 30 and 32 which include rams 34 and 36, each of which is disposed for reciprocating motion within its respective thruster. The purpose of the thruster is to forcibly eject store 20 downward and away from the aircraft simultaneously with release of the store by carrier 22 to minimize the possibility of the store striking the aircraft after release. Thrusters 30 and 32 are each mounted to aircraft structural portion 40 and are normally enclosed by cover 42 which has been displaced in FIG. 1 for clarity. Store 20 is illustrated in FIG. 1 just after release by carrier 22 at the point where rams 34 and 36 are fully extended. In contrast, FIG. 2 shows the rams in their fully retracted position and with hook 24 in engagement with tongue 42 of carrier 22. In this position store 20 is maintained in longitudinal and lateral alignment with respect to ejector rack assembly by alignment pin 44 which seats in hanger 45 as shown. Alignment is also maintained by rams 34 and 36 which are seated in sway braces 46 and 48, respectively.

Both the thrusters and the release mechanism are actuated by compressed air from a remotely located onboard pressurization unit (not shown) which supplies dry filtered and pressurized air to accumulator 50. The accumulator 50 is in fluid communication with ejector rams 30 and 32 by means of manifold 52 and feed conduits 54 and 56, respectively. The accumulator is likewise in fluid communication with release piston chamber 60. Upon command, high pressure air is provided from the accumulator to hook release piston chamber 60, driving hook release piston 62 downward, actuating release mechanism 26. Hook 24 is then rotated counterclockwise (as seen in FIG. 2) driving tongue 42 downward and releasing store 20. Simultaneously, high pressure air is provided from the accumulator to ram chambers 70 and 72 (not shown) within ejector rams 30 and 32, driving rams 34 and 36 downward and forcibly ejecting store 20 away from the aircraft. Ejector rack assemblies of the type generally described above are known in the prior art as exemplified by U.S. Pat. Nos. 5,583,312 and 6,035,759, which patents are incorporated herein by reference.

It is also known to be desirable to differentially control the air pressure provided to thruster assemblies as described above in order to control the force imparted by each ram to the store. Such differential control permits adjustment of ejector rack for stores of varying mass and mass distribution. In connection with the present invention, apportionment of pressurized fluid to ejection rams 30 and 32 is accomplished by means of adjustable valve assemblies 80 and 82, respectively, positioned between feed conduits 54 and 56 and the thrusters to which each is attached. It is understood that these valve assemblies are identical in construction, so only one will be described herein.

Figure 3:
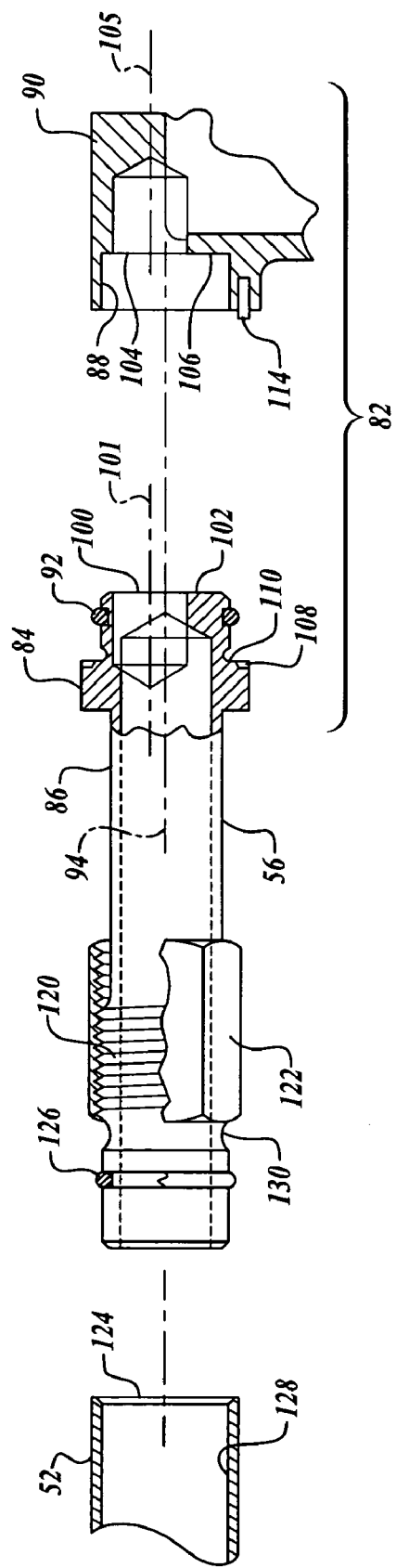
FIG. 3 is a partial side view, partially in a section, of the aft manifold conduit and an adjustable flow restricting device according to an embodiment of the present invention.

Referring to FIG. 3, in this embodiment, fitting 84 is attached to feed conduit 86 of feed conduit 56. Fitting 84 is slidably insertable in bore 88 of receiver 90. O-ring 92 is positioned on fitting 84 as shown to provide a fluid tight seal between the fitting and the receiver. Accordingly, feed conduit 56 may be rotated about its centerline 94 and translated parallel to that center line without disturbing the seal between fitting 84 and receiver 90. A circular opening 100 having a centerline 101 is formed in face 102 of fitting 84 and is positioned eccentrically with respect to centerline 94. Fluid flowing through feed conduit 56 toward fitting 84 must exit the fitting through opening 100. Similarly, circular opening 104 having a centerline 105 is formed in the base of bore 88 and also positioned eccentrically with respect to center line 94. Fluid passing into the receiver through bore 88 must pass through opening 104 as it enters thruster 32. Accordingly, it can be seen that when fitting 84 is seated in receiver 90 and rotated with respect to the receiver such that there is overlap between openings 100 and 104, fluid may pass through feed conduit 56, then through the orifice formed by overlapping openings 100 and 104 and through receiver 90 into thruster 32. By rotating feed conduit 56 with respect to receiver 90, the overlap between openings 100 and 104 can be varied, thus forming a variable area orifice which can be used to control fluid flow into thruster 32. In order to fix the rotational position of feed conduit 56 with respect to fitting 90 (and therefore fix the area of the orifice formed by openings 100 and 104), pin 114 may be inserted into one of a plurality of detents such as detent 108 formed in face 110 of the fitting. Details of a similar valve arrangement can be found in U.S. Pat. No. 6,009,788, incorporated herein by reference.

In operation, the nominal pressure of the compressed air passing through feed conduit 56 and into valve assembly 82 is approximately 6,000 PSI. As that fluid passes through the orifice and valve assembly 82 it may experience a significant reduction in pressure depending upon the selected cross-sectional area of the orifice, thus creating a significant pressure differential across the valve. It has been found, however, that a slight gap may develop between faces 102 and 106, permitting fluid to flow into the area between, decelerating and rising in pressure as it does so. The resulting pressure differential tends to force face 102 of fitting 84 to separate further from face 106, causing erratic performance of valve assembly 82. In order to prevent such separation, threads 120 are formed on the external surface of feed conduit 56 and collar 122, which is internally threaded to match threads 120, is positioned thereon. When manifold 52, feed conduit 56 and receiver 90 are assembled, the feed conduit is inserted sufficiently far into the manifold that o-ring 126 sealably engages inner wall 128 of the manifold and end 124 is disposed over recess 130 of the feed conduit. Then, in order to ensure that face 102 of fitting 84 and face 106 of receiver 90 remain firmly in engagement during operation, collar 122 is rotated into contact with face 124 of the manifold and tightened as desired. In order to adjust the rotational position of fitting 84 with respect to receiver 90, the collar merely needs to be loosened sufficiently that pin 114 is disengaged from the detent and moved to the left, permitting it to be rotated to the desired position. After the feed conduit is repositioned the collar is again rotated in the contact with end 124 and tightened, re-engaging faces 102 and 106.

Figure 4:
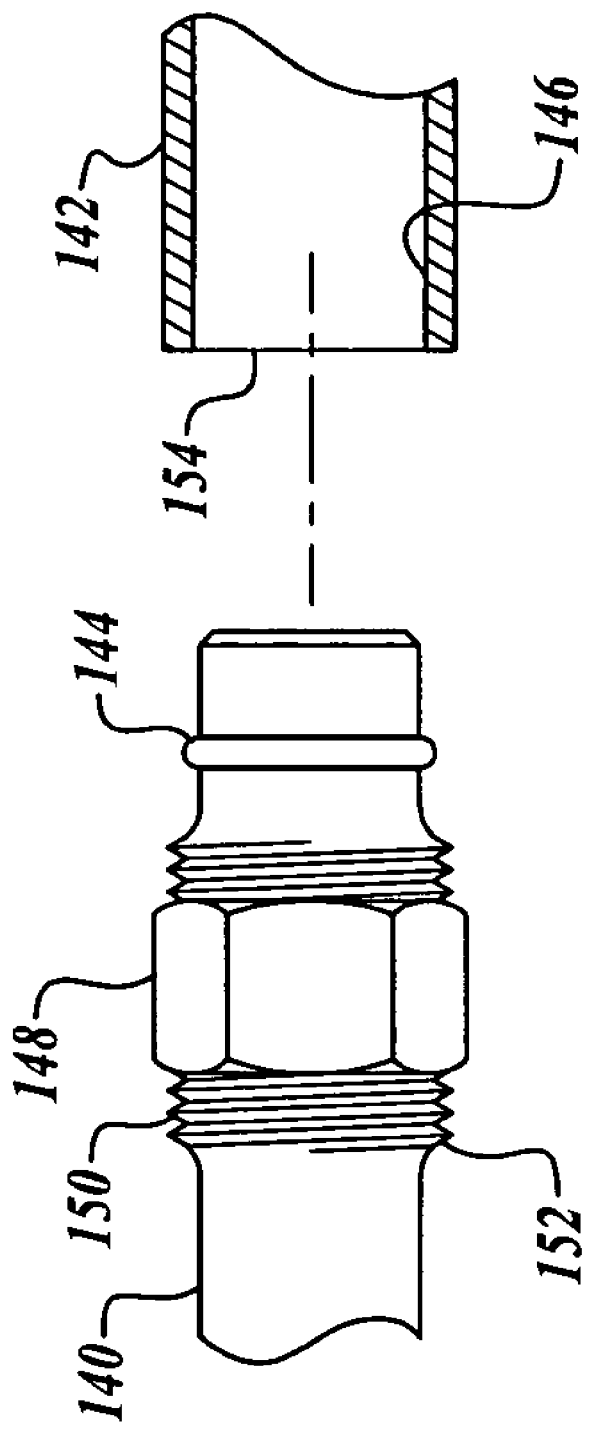
FIG. 4 is a partial side view, partly in section of a second embodiment of the subject adjustable flow restricting device.

FIG. 4 illustrates a second embodiment of the present invention in which the collar has been mounted on the manifold rather than the feed conduit. In this embodiment, manifold 140 is sized to be insertable in feed conduit 142 with o-ring 144 providing sealing engagement with inner wall 146. Collar 148 engages threads 150 formed on external surface 152 of the manifold. When manifold 140 is inserted sufficiently into the feed conduit that o-ring 144 seats on inner surface 146, collar 148 can be rotated into contact with end 154, urging faces 102 and 106 (not shown) into engagement.

Figure 5:
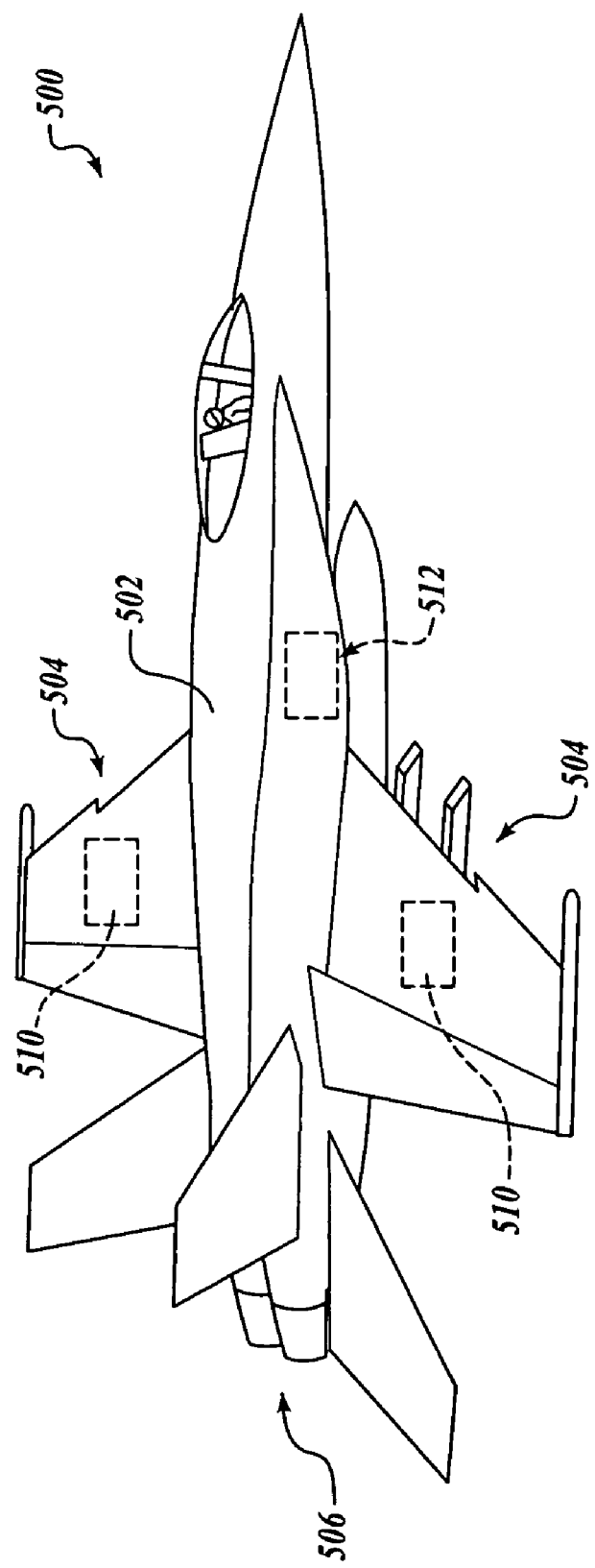
FIG. 5 is a side view of an aircraft in accordance with another embodiment of the invention.

It will be appreciated that embodiments of apparatus and methods in accordance with the present invention may be employed on a wide variety of aerospace vehicles. For example, FIG. 5 is a side view of an aircraft 500 in accordance with another alternate embodiment of the invention. In this embodiment, the aircraft 500 includes a fuselage 502, a pair of wings 504, and at least one engine 506. The aircraft 500 further includes a pair of stores separation systems 510 in accordance with the present invention located on the lower surfaces of each of the wings 504. In one particular embodiment, each of the systems 510 is of the type described above and shown in FIGS. 1–4. It will be appreciated that a variety of alternate embodiments of stores separation systems in accordance with the invention may be conceived. For example, in one alternate embodiment, a stores separation system 512 in accordance with the present invention may be operatively coupled to the fuselage 502 rather than to the wings 504 (e.g. to eject a bomb, missile, drop tank, payload, etc), or to any other suitable portion of the aircraft 500.

Furthermore, although the aircraft 500 shown in FIG. 5 is representative of a well-known fighter aircraft, specifically, an F/A-18E Super Hornet manufactured by The Boeing Company, in alternate embodiments, virtually any other type or variety of military aircraft may be conceived that include apparatus and methods in accordance with the present invention. In alternate embodiments, for example, the aircraft may be a fighter aircraft, a rotary aircraft, a bomber aircraft, or any other suitable type of manned or unmanned aircraft, including those described, for example, in The Illustrated Encyclopedia of Military Aircraft by Enzo Angelucci, published by Book Sales Publishers, September 2001, and in Jane's All the World's Aircraft published by Jane's Information Group of Coulsdon, Surrey, United Kingdom, which texts are incorporated herein by reference.

While preferred and alternate embodiments of the invention have been illustrated and described, as noted above, many changes can be made without departing from the spirit and scope of the invention. Accordingly, the scope of the invention is not limited by the disclosure of the preferred and alternate embodiments. Instead, the invention should be determined entirely by reference to the claims that follow.

We claim:

1. A stores ejector rack for an aircraft, the rack comprising:
   at least one pneumatically operated thruster for ejecting a store away from the aircraft;
   a manifold for distributing pressurized gas from a source to the thruster;
   an adjustable valve assembly for varying the pressure of the gas supplied to the thruster, the valve assembly including first and second valve members;
   a feed conduit connected to the manifold and to one of the valve members; and,
   a collar engageable with the manifold and the feed conduit for urging the valve members into contact.

2. The device of claim 1 wherein the collar is threadably engageable with the feed conduit.

3. The device of claim 1 wherein the collar is rotatably engageable with the manifold.

4. The device of claim 3 wherein the collar is rotatably engageable with an end of the manifold.

5. The device of claim 1 further including a fluid tight seal disposed between the manifold and the feed conduit.

6. The device of claim 1 wherein the collar is threadably engageable with the manifold.

7. The device of claim 1 wherein the collar is rotatably engageable with the feed conduit.

8. The device of claim 1 wherein the feed conduit is rotatably connected to the manifold.

9. The device of claim 1 wherein the collar is threadably engageable with the feed conduit and rotatably engageable with an end of the manifold, the feed conduit is rotatably connected to the manifold and a fluid tight seal is disposed between the manifold and the feed conduit.

10. A vehicle, comprising:
   a body portion;
   one or more lifting surfaces operatively coupled to the body portion;
   at least one engine operatively coupled to the body portion; and
   a store separation system operatively coupled to at least one of the lifting surfaces and the body portion, the store separation system including:
      a stores ejector rack comprising:
         at least one pneumatically operated thruster for ejecting a store away from the aircraft;
         a manifold operatively coupled to the at least one thruster and adapted to distribute a pressurized gas to the thruster;
         an adjustable valve assembly coupled to the manifold and adapted to vary the pressure of the gas supplied to the thruster, the valve assembly including first and second valve members;
         a feed conduit connected to the manifold and to one of the valve members; and
         a collar engageable with the manifold and the feed conduit for urging the valve members into contact.

11. The vehicle of claim 10 wherein the collar is threadably engageable with the feed conduit.

12. The vehicle of claim 10 wherein the collar is rotatably engageable with the manifold.

13. The vehicle of claim 11 wherein the collar is rotatably engageable with an end of the manifold.

* * * * *